Dec. 7, 1971
F. S. LOWNDES
3,624,949
FISH HOOK POSITIONING DEVICES
Filed Oct. 20, 1969
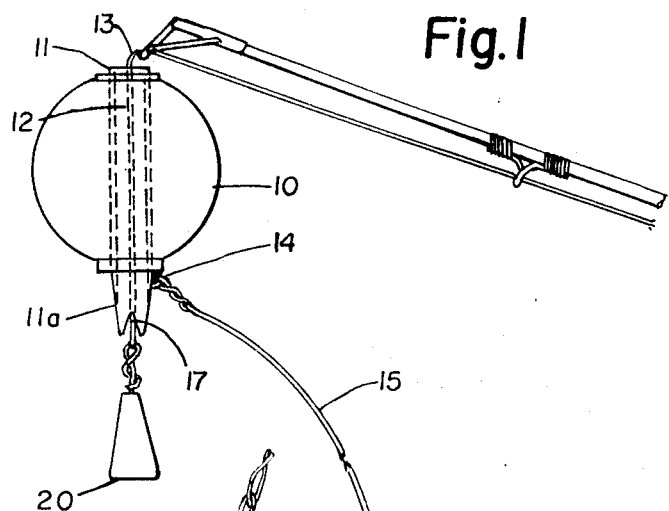
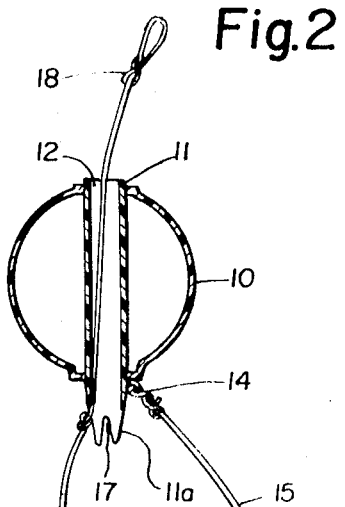
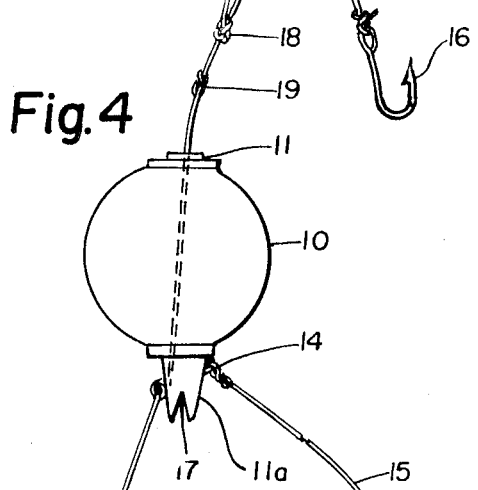
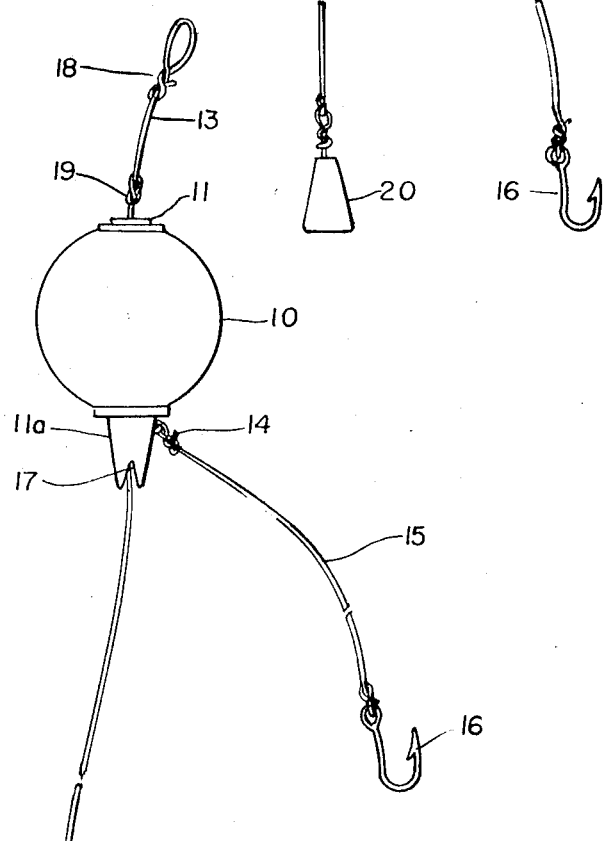
INVENTOR
FREDERICK S. LOWNDES
BY
his ATTORNEYS

United States Patent Office 3,624,949
Patented Dec. 7, 1971

3,624,949
FISH HOOK POSITIONING DEVICES
Frederick S. Lowndes, 106 Tyler Road,
Pittsburgh, Pa. 15237
Filed Oct. 20, 1969, Ser. No. 867,636
Int. Cl. A01k *93/00*
U.S. Cl. 43—43.15
6 Claims

ABSTRACT OF THE DISCLOSURE

A fish hook positioning device is provided for positioning a hook relatively to a fish line and comprising a floatation member having a passageway therethrough adapted slidingly to receive a fish line, a drop line attaching means on the floatation means, and a line stop engaging means on the passageway adapted to engage a stop on the line and hold the floatation means at the stop position.

---

This invention relates to fish hook positioning devices and particularly to hook carrying devices automatically positioned on the fish line by a combination of floatation action and line control as hereafter more fully described.

It is a common practice, particularly when bait casting in lakes and streams, to attempt to position the fish hook and bait above the sinker which is normally on the end of the line. This positioning is normally done by fastening a hook on the line by means of a drop line or leader at a point remote from the sinker. This fixes the hook positively with respect to the sinker and is undesirable for a variety of reasons. In the first place, when the line is reeled in, it cannot be reeled beyond the point of attachment of the hook, so that there is a considerable portion of line to which the sinker is attached extending beyond the end of the rod so that casting is made much more difficult. In order to get the maximum effectiveness in casting, it is desirable that the sinker and bait be close together at the end guide of the rod. This is not possible with such a conventional practice. The second problem with this conventional practice is that the hook and sinker are relatively fixed and they are always the same distance apart. This is not always desirable where the water depth varies as it does from the shore toward the middle of a river or lake. In an attempt to solve this problem various devices have been proposed. For example, Patent 3,164,922 shows a form of keyhole attachment for the drop line which can be shifted manually from one position to another on the line. Unfortunately, this does not solve the problem of the original fixed position of the bait. It does make it possible to manually adjust the position but once the position is adjusted, it is fixed. Patent 2,857,704 provides another form of adjusting means for varying the position of the drop line on the fish line. But again the position must be fixed manually and cannot be positioned automatically by the water into which the cast is made.

No one, so far as I am aware, has successfully solved the problem. As I have pointed out above, all of the devices known to me which have been proposed for solving this problem are simply manual adjustment devices, and the adjustment must be made manually before the cast is made.

I have invented a device which makes it possible to automatically position a hook relative to a sinker along the fish line between a minimum and a maximum position.

Preferably I provide a floatation means having a passage therethrough adapted to slidably receive a fish line, a drop line attaching means on said floatation means, a main stop member on the fish line, an intermediate stop means on the line between the main stop means and the sinker adapted to pass through the passage, and a plurality of slots at the end of the passage through the floatation means adapted to receive the line, but to engage the intermediate stop means. The intermediate stop means is preferably a knot about four inches below the main stop. The main stop is preferably a loop knotted in the line. Preferably the floatation means is a hollow plastic float having a diametrical tube extending therethrough, through which the line passes, the tube extending beyond the circumference of the ball preferably at the bottom only and being slotted at the bottom end at 90° intervals in order to catch the line. The hook attaching means is preferably fixed to the float adjacent the passage through the float.

In the foregoing general description I have set out certain objects, purposes, and advantages of my invention. Other objects, purposes, and advantages will be apparent from a consideration of the following description and the accompanying drawings in which:

FIG. 1 is a side elevation of a device according to my invention attached to a line;

FIG. 2 is a section through the diameter of the device of FIG. 1;

FIG. 3 is a side-elevational view of the device according to my invention showing the device moving upwardly along the fish line as cast; and, FIG. 4 is a side-elevational view of the device according to my invention in the lock position as a result of drawing the fish line taut.

Referring to the drawings, I have shown a hollow water and pressure proof plastic float 10 of generally spherical form having a diametrical tube 11 of plastic extending therethrough forming a passage 12 through which a fish line 13 may pass. Preferably the tube 11 has a conical end 11a extending out of the bottom of the float. A drop line attaching ring 14 is fixed to the bottom of the float 10 adjacent the tube exit to which is attached a leader 15 carrying a hook 16. The bottom conical end 11a of the cylindrical member 11 is provided with notches 17 at 90° intervals. The fish line is provided with a main top limiting stop 18 and with one smaller stop member 19 spaced therefrom. To operate the device, the line is held straight and the float is slid down to the sinker 20 over the intermediate stop 19 so that the float and sinker are at the end of the fish line where they are brought together at the end guide of a casting rod and the cast is made in the usual manner. When the sinker and the float strike the water, the sinker and float separate as shown in FIG. 3 at a very rapid rate until the float reaches its maximum floatation position or strikes the top limit stop 18. When the line is drawn tight, the intermediate stop member 19 is engaged beneath the slots 17 so as to catch the float so that when the line is reeled in, the float remains at a fixed position on the line retaining the hook at a fixed position relative to the sinker, thus holding the float in the position as shown in FIG. 4 relative to the sinker. The slots 17 are of sufficient thickness to permit the line to slide therein but to engage and hold the stop 19.

Loss of tackle and of the float 10 can be prevented by fastening the sinker 20 to the end of the fish line with a short piece of lighter test line so that if the sinker becomes snagged, the light line can be broken without damaging the tackle or losing the float, hook and the bait.

While I have illustrated and described the present and preferred embodiment of my invention in the foregoing specification, it will be understood that this invention may be otherwise embodied within the scope of the following claims.

I claim:

1. A fish hook positioning device comprising a floatation member having a passageway therethrough slidingly receiving a fish line, a drop line attaching means on said floatation means, an intermediate line stop on said fish line adapted to freely pass through the passageway on the floatation member and a line stop engaging means on the floatation member about the passageway adapted to engage said intermediate stop on the line, and hold the floatation means at the stop position on upward movement of the line.

2. A fish hook positioning device as claimed in claim 1 having a main stop on the fish line spaced from the end thereof on the opposite side of the intermediate stop limiting the movement of the floatation means away from said end.

3. A fish hook position means comprising a floatation member having a passageway therethrough slidingly receiving a fish line, a drop line attaching means on said floatation means, a line stop engaging means on the floatation member about the passageway adapted to engage a stop on the line, and hold the floatation means at the stop position, a main stop in the fish line spaced from the end thereof limiting the movement of the floatation means away from said end and at least one smaller stop between the main stop and said end adapted to freely pass through said passageway in the floatation means when the floatation means is moving toward the main stop and engaged by the line stop engaging means when the floatation means moves toward the end of the line.

4. A fish hook positioning means as claimed in claim 3 wherein the line stop engaging means is a plurality of slots in the end of the floatation member at the passageway adapted to receive and pass the fish line but engage said stop.

5. A fish hook positioning means as claimed in claim 1 wherein the floatation means is a hollow sphere having a cylindrical member extending diametrically therethrough and extending beyond the circumference to form a passageway therethrough.

6. A fish hook positioning means as claimed in claim 5 wherein the line stop engaging means is a series of spaced slots in the end of the cylindrical member.

References Cited

UNITED STATES PATENTS

| | | | |
|---|---|---|---|
| 2,289,663 | 7/1942 | Linhares | 43—43.15 X |
| 2,892,283 | 6/1959 | Hudson | 43—43.4 |
| 2,902,792 | 9/1959 | Friday | 43—44.87 |
| 2,952,937 | 9/1960 | Wassing | 43—43.15 |

HUGH R. CHAMBLEE, Primary Examiner

U.S. Cl. X.R.

43—44.87, 44.91